United States Patent

[11] 3,619,414

[72] Inventors Ivor W. Mills
 Media;
 Merritt C. Kirk, Jr., Thronton; Albert T. Olenzak, Media, all of Pa.
[21] Appl. No. 812,516
[22] Filed Feb. 19, 1969
[45] Patented Nov. 9, 1971
[73] Assignee Sun Oil Company
 Philadelphia, Pa.
 Continuation-in-part of application Ser. No. 622,398, Mar. 13, 1967, now Patent No. 3,462,358, Continuation-in-part of application Ser. No. 636,493, May 5, 1967, Continuation-in-part of application Ser. No. 652,026, July 10, 1969, Continuation-in-part of application Ser. No. 730,999, May 22, 1968.

[54] CATALYTIC HYDROFINISHING OF PETROLEUM DISTILLATES IN THE LUBRICATING OIL BOILING RANGE
 17 Claims, No Drawings
[52] U.S. Cl. ................................................. 208/143, 208/14, 208/18, 208/264, 252/470
[51] Int. Cl. ....................................................... C10g 23/02
[50] Field of Search ........................................... 208/14, 18, 264, 143

[56] References Cited
 UNITED STATES PATENTS

| | | | |
|---|---|---|---|
| 2,960,458 | 11/1960 | Beuther et al. | 208/143 |
| 2,967,146 | 1/1961 | Manley | 208/18 |
| 2,980,603 | 4/1961 | Fear | 208/18 |
| 3,000,807 | 9/1961 | Wasson et al. | 208/14 |
| 3,053,760 | 9/1962 | Henke et al. | 208/264 |
| 3,078,221 | 2/1963 | Beuther et al. | 208/264 |
| 3,318,799 | 5/1967 | Acker et al. | 208/14 |
| 3,382,168 | 5/1968 | Wood et al. | 208/264 |
| 3,252,887 | 5/1966 | Rizzuti | 208/14 |
| 3,403,092 | 9/1968 | Rausch | 208/264 |
| 3,369,999 | 2/1968 | Donaldson et al. | 208/264 |
| 3,406,111 | 10/1968 | Wynkoop et al. | 208/14 |
| 2,288,373 | 6/1942 | Smith et al. | 208/14 |

FOREIGN PATENTS

| | | | |
|---|---|---|---|
| 743,525 | 9/1966 | Canada | 208/14 |

Primary Examiner—Herbert Levine
Attorneys—George L. Church, Donald R. Johnson, Wilmer E. McCorquodale, Jr. and Barry A. Bisson ABSTRACT: A process for the catalytic hydrofinishing of petroleum distillate in the lubricating oil boiling range (e.g., to produce lube oils, rubber oils, refrigerator oils, transformer oils, cable oils ATF and friction drive transmission fluids, etc.) comprises contacting a lubricating oil distillate stock with hydrogen, in the presence of a catalyst comprising a hydrogenating component selected from the group consisting of sulfides and oxides of (a) a combination of molybdenum and at least one iron group metal (e.g., Co, Ni, Fe, W) and (b) a combination of nickel and tungsten.

Preferably, the hydrogenating component is composited with an inorganic oxide support (preferably refractory), and the contacting carried out at an average catalyst temperature of about 650–765° F. and with at least from 500 p.s.i. of hydrogen (preferably 800–3000 p.s.i.). The combination of conditions is so selected as to effect appreciable hydrogen consumption but no substantial cracking. Clay finishing of the catalytically hydrofinished product can be advantageous where it is desired to have such additional improvement as better electrical properties or lighter color.

CATALYTIC HYDROFINISHING OF PETROLEUM DISTILLATES IN THE LUBRICATING OIL BOILING RANGE

CROSS REFERENCES TO RELATED APPLICATIONS

The present application is a continuation-in-part of the following applications, all of which are copending with the present application and are assigned to the Sun Oil Company to which the present application is also assigned: Ser. No. 622,398, filed March 13, 1697 of Ivor W. Mills and Glenn R. Dimeler entitled "Clay Treatment of Hydrorefined Cable Oils" now patent 3,462,358; Ser. No. 636,493, filed May 5, 1967 of Ivor W. Mills, Glenn R. Dimeler and Merritt C. Kirk, Jr. entitled "Process for Preparing an Aromatic Oil and Non-Discoloring Rubber Composition Containing Said Oil;" Ser. No. 652,026, filed July 10, 1967 of Ivor W. Mills and Glenn R. Dimeler entitled "Process for Producing Cable Oils by Sequential Refining Steps;" and Ser. No. 730,999, filed May 22, 1968 of Ivor W. Mills and Glenn R. Dimeler entitled "Hydrorefined Transformer Oil and Process of Mufacture," the disclosure of all of the above-referred to applications is hereby incorporated herein by reference. The present application contains subject matter which was described but not claimed in the above-referred to applications.

SUMMARY OF THE INVENTION

This invention relates to single or multiple stage hydrofinishing (including aromatization or dearomatization) of petroleum distillate in the lubricating oil boiling range (and, especially, of naphthenic distillates boiling mainly above 580° F.).

Such a process for the catalytic hydrofinishing of petroleum distillate in the lubricating oil boiling range to produce lube oils, rubber oils, refrigerator oils, transformer oils, cable oils, ATF and friction drive transmission fluids, etc., comprises contacting a lubricating oil distillate stock with hydrogen, in the presence of a catalyst comprising a hydrogenating component selected from the group consisting of sulfides and oxides of (a) a combination of molybdenum and at least one iron group metal, (b) a combination of nickel and tungsten, and (c) molybdenum (e.g., $MoS_2$). Preferably, the hydrogenating component is composited with an inorganic oxide support (preferably refractory) such as silica or alumina, and the contacting carried out at an average catalyst temperature of about 500°–800° F., on L.H.S.V. of 0.1–8.0 (based on the fresh feed) with from 500–3000 p.s.i. of hydrogen entering the reactor, the combination of conditions being so selected as to effect appreciable hydrogen consumption but no substantial cracking. Gas (e.g., hydrogen) recycle can be from 0–20,000 SCF/BB1.

Clay finishing of the catalytically hydrofinished product can be advantageous where it is desired to have such additional improvement as low initial dissipation factor (I.D.F.) or lighter initial color.

Where the charge stock is highly aromatic (such as heavy aromatic extracts obtained by extraction of aromatic or naphthenic oils with an aromatic selective solvent or with acid, temperatures as low as 450° F. and pressures as low as 500 p.s.i.g. can be used to obtain a satisfactory decrease in the ultraviolet absorptivity at 260 millimicrons; however, the preferred conditions include a temperature of at least 650° F. (typically, 650°–680° F.) and pressures of at least 800 p.s.i. of hydrogen (typically 1200–3000 p.s.i.) and wherein the hydrogen is from 50–100 percent pure (typically "reformer" hydrogen of 65–85 percent purity).

One aspect of the invention involves preparing an aromatic hydrocarbon fluid useful as a rubber processing oil having a reduced tendency to discolor upon aging (e.g., as in the presence of ultraviolet light). Such a fluid can be prepared by a two-step hydro-aromatization process wherein the feed is a naphthenic distillate boiling mainly above 580° F. having a viscosity in the range of 40–10,000 SUS at 100° F. and containing nonhydrocarbon impurities comprising organic heterocyclic sulfur and nitrogen compounds and containing no more than 30 percent aromatic hydrocarbons.

One aspect of the invention involves a process for producing electrical grade oils (e.g., cable oils, transformer oils) comprising contacting a naphthenic distillate having a viscosity in the range of 40–10,000 SUS at 100° F. with hydrogen and a nickel-containing catalyst under conditions selected as to effect appreciable hydrogen consumption but no substantial cracking and contacting the resulting hydrorefined oil with clay. Similarly, a single stage hydrogenation can be used to prepare a refrigerator oil, using a catalyst comprising Ni-W on $Al_2O_3$.

Another aspect of this invention relates to the removal of nitrogen and sulfur and the saturation of the aromatics in a naphthenic or paraffinic lube stock to less than 2 weight percent (preferably, less than 1 percent, typically 0.0–0.5 percent) to prepare a useful fluid in toric or friction drive transmissions (i.e., a "traction fluid").

DESCRIPTION

A process for producing lubricating oil stocks of improved stability comprises contacting a lubricating oil distillate stock with hydrogen, in the presence of a catalyst comprising a hydrogenating component selected from the group consisting of sulfides and oxides of (a) a combination of molybdenum (e.g., $MoS_2$), molybdenum and at least one iron group metal (e.g., $CoMoS_x$, $NiMoS_x$) or molybdenum and at least two iron group metals ($NiCoMoS_x$) and (b) a combination of nickel and tungsten (e.g., NiW). The catalyst metal is preferably in sulfide form and preferably is on a support which has low hydrocracking activity (e.g., silica, alpha alumina, bauxite), the contacting being carried out at an average catalyst temperature of about 500° F. to 800° F. (e.g., 575°–750° F.) at a liquid hourly space velocity (L.H.S.V.) in the range of 0.1–8.0 (e.g., about 0.5–4 liquid volumes of oil per volume of catalyst per hour) and at a pressure of about 500–3000 p.s.i.g. of hydrogen at the reactor inlet. The combination of conditions is so selected as to effect appreciable hydrogen consumption but not substantial cracking.

For many oils, the additional improvement imparted by clay treatment of the hydrorefined product can be justified economically. Such oils include the electrical oils, refrigerator oils, highly aromatic plasticizers for rubber or vinyl (e.g., those containing at least 45 percent of aromatics), and traction fluids.

As has been shown in the previously referred to copending applications of Mills and Dimeler, Ser. No. 622,398, it is sometimes advantageous in the clay finishing of electrical oils, such as cable oils, to utilize a critical dosage of an acid-activated clay or a combination of acid-activated clay and attapulgite in order to obtain the desired electrical characteristics. The catalyst and hydrogenation conditions disclosed in said Ser. No. 622,398 are useful in practice of the present invention when it is desired to produce an electrical oil. Also useful are the adsorbent admixtures (and process conditions) disclosed in U.S. Patent No. 3,369,999 for the decolorizing of waxes.

For example, when the catalyst comprises a combination of molybdenum and at least two iron group metals, the catalyst can contain from about 2 to 25 wt. percent of molybdenum and the ratio of each iron group metal to molybdenum can be less than about 0.4 (for example, Filtrol 500–8, which is NiCoMo on $Al_2O_3$). However, other molybdenum containing catalysts which also contain at least two iron group metals can be used in the present invention. For example, the NiCoMo catalyst which is available commercially from Universal Oil Products Corporation under the designation S-6 and analyzing 0.5–1 percent Co, about 3 percent Ni and about 7 percent Mo, on $Al_2O_3$, is particularly useful in the production of a transformer oil. Other useful catalysts are those in U.S. Pat. No. 3,424,673, I & E CHEM., 51 (011), pages 1349–1350, (Nov., 1959), and in the previously referred to copending applications of Mills et al., for example.

As has been long known in the art (e.g., see U.S. Pat. No. 2,726,193 of Docksey et al.) a usual (and useful) processing technique in conjunction with hydrogenations which effect hydrodesulfurization of petroleum stocks is to "flash-off" the $H_2S$ produced (which can, in part, be dissolved in the oil).

In the production of an electrical oil, the conditions, catalysts and processing techniques disclosed in the previously referred to copending applications, Serial No. 730,999 can also be of advantage in the present invention. Similarly, the techniques, including the acid-treatment, of previously referred to copending application, Serial No. 652,026 can also be useful in the present invention. Such acid treatment (or treatment with an acidic clay) aids in reducing the content of "basic" nitrogen in the final product oil. Other catalysts which can be of use in the production of hydrorefined 40–10,000 SUS oils are those disclosed in copending application of Merritt C. Kirk, Jr. filed Feb. 13, 1969 entitled "PRODUCTION OF HIGH QUALITY FUELS BY TWO-STAGE HYDROGENATION." In oxide form, the catalysts can also contain $Fe_3O_4$ or CuO prior to sulfiding in addition to Ni, Ni and Mo, Ni and W, or Ni and Co.

Product recycle, for example, in U.S. Patent No. 2,900,433, can be used, preferably at a product to feed fresh ratio below 10:1 (more preferably, 8:1 to 1:1 ). Preferably, the reaction conditions (particularly the temperature) are chosen such that no substantial cracking occurs; that is, no more than 20 percent (preferably less than 10 percent) of the feed stock is converted to material boiling below 300° F.

Although the maximum hydrorefining temperature which will not produce substantial cracking is somewhat dependent upon the space velocity, the type of catalyst and the pressure, generally it is below 750° F. For severe hydrorefining under conditions where the gel aromatic content of the original feed stock is not substantially increased but where the 335 UVA is sufficiently great to impart reasonable oxidation stability to the product, the preferred conditions include a temperature in the range of 650°–680° F. Preferred hydrogen pressures at the reactor inlet are in the range of 800–3000 p.s.i. (wherein the hydrogen is from 50–100 percent pure) and, more preferably, a hydrogen pressure at the reactor inlet in the range of 1200–3000 p.s.i. In the usual fixed bed hydrogenation reactor, the purity of the hydrogen, and, thus, the partial pressure exerted by the hydrogen decreases as the gas moves through the bed and hydrogen is consumed. Therefore, we prefer to refer to the hydrogen pressure in our process in terms of the partial pressure of the hydrogen at the reactor inlet, in order that at least some of the feed is insured contact with a specified minimum concentration of hydrogen.

Typical of severe hydrorefining methods which can be used in our process when conducted within the processing conditions referred to herein are those of U.S. Pat. Nos. 2,968,614; 2,993,855; 3,012,963; 3,114,701; 3,144,404 and 3,278,420.

Typical catalysts are molybdenum oxide, cobalt-molybdenum oxide, nickel-molybdenum oxide, cobalt-nickel-molybdenum oxide and tungsten-nickel-molybdenum oxide, preferably presulfided and on a carrier such as silica, alumina, alumina titania and alumino-silicates (either crystalline or amorphous). When the carrier is an alumino-silicate which has acid (cracking) activity, the reaction conditions are preferably controlled so as to avoid excessive hydrocracking. Nickel sulfide, nickel-molybdenum sulfide, tungsten disulfide, nickel-tungsten sulfide and molybdenum disulfide, per se or on a carrier, can also be used as catalysts. Examples of operable catalysts are those of U.S. Pat. Nos. 2,744,052; 2,758,957; 3,053,706; 3,182,016; 3,205,165; 3,227,646; and 3,264,211.

One process for producing transformer grade oils of good stability and good yields comprises contacting a distillate oil having an aromatics content less than 30 percent (e.g., no greater than 25 percent), an alkanes content not greater than 5 percent, the balance being substantially all naphthenes, and having a flash point not less than 275° F., a viscosity at 100° F. of about 50 to 85 SUS, and a viscosity at 32° F. of not more than about 280 SUS with about 500 to 4000 SCF/BBl of a hydrogen-containing gas containing at least 60 percent hydrogen with a catalyst comprising a hydrogenated component selected from the group consisting of sulfides and oxides of (a) a combination of about 4 to 16 percent by weight molybdenum and and at least two iron group metals where the iron group metals are present in such amounts that the ratio of each iron group metal to molybdenum is less than about 0.4, and (b) a combination of about 10 to 25 percent by weight of nickel and tungsten where the atomic ratio of tungsten to nickel is about 1:03 to 4, said hydrogenating component being composited with an alumina support, said contacting being carried out at an average catalyst temperature of about 575°–645° F., at a space velocity of about 1.5 to 3 liquid volumes of oil per volume of catalyst per hour, and at a pressure of about 1000 to 1800 p.s.i.g., the combination of conditions being so selected as to effect appreciable hydrogen consumption but no substantial cracking, stripping the hydrogenated oil at a temperature of about 325°–600° F. to remove hydrogen sulfide, and clay treating the stripped hydrogenated oil in a proportion not exceeding about 250 barrels of oil per ton of clay.

EXAMPLE I

A naphthenic distillate in the transformer oil boiling range is hydrogenated over presulfided UOP S–6 catalyst at a temperature of 680° F., 1500 p.s.i.g. of pure hydrogen, at an L.H.S.V. of 0.4 and a hydrogen oil ratio of 5 moles/mole to produce a hydrorefined oil which is greatly reduced in polycyclic aromatic compounds and which contains less sulfur and gel aromatics than did the original charge stock. The hydrorefined oil has a Doble life of about one day. After contacting with a clay (e.g., 5–40 lbs. of attapulgite per BB1. of oil) such an electrical oil can have a Doble life in the order of 2 to 3 days (see U.S. Pat. No. 3,406,111 for a description of the Doble test).

The above-referred to copending application, Ser. No. 730,999 discloses, in detail, the effect upon the properties of the resulting transformer oil (especially regarding the 335 UVA, gel aromatics and sulfur and nitrogen removal) when such hydrogenations are conducted at temperatures in the range of about 500°–800° F. (and at pressures above 800 p.s.i. of $H_2$). The teachings of that application can be used to "tailor-make" transformer oils having particular desired combinations of oxidation stability and impulse breakdown strength. To minimize the ultraviolet absorptivity at 335 $m\mu$ (i.e., 335 UVA), a preferred temperature range is about 575°–645° F. (600° F. being about the minimum point), such low 335 UVA and low nitrogen content transformer oils have good response to the usual oxidation inhibitors used in transformer oils. However, when it is desired that the uninhibited oil have a long sludge-free life under the Doble test conditions, the hydrorefining conditions should be such as to both lower the nitrogen to less than 25 p.p.m. *(preferably less than 15 p.p.m.) and also to increase the 335 UVA to greater than 0.04 (preferably at least 0.06). Such low nitrogen and relatively high 335 UVA in a hydrorefined transformer oil can be obtained in the present process when at least one portion of hydrogenation includes temperatures greater than 680° F. (e.g., 685°–765° F.).

Oils having viscosities in the range of 40–2000 SUS at 100° F., nitrogen below 25 p.p.m. and a 335 UVA greater than 0.04 can also be useful as coolants for a nuclear reactor since they have good stability when exposed to nuclear radiation.

The S–6 catalyst and other NiCoMo catalysts are also useful for desulfurization and hydrogenation of crude oils (such as Lagomedio at 750° F., 1500 p.s.i.g. of $H_2$, 0.1-2 L.H.S.V., 0–10,000 SCF/BBl recycle). Such a crude hydrogenation can be an economical means of utilizing natural gas to produce hydrogen which otherwise would have little value as can be the case where a locality has no gas pipelines.

Another useful catalyst (preferably presulfided) in the production of electrical oils is Ni–Mo, such as that which is available under the trade name Aero HDS–'(3 percent NiO and 15 percent MoO₃). Additional advantage is found when such a catalyst as HDS-3 is impregnated with additional Ni (as to produce a catalyst analyzing from 5-20 percent Ni in the oxide form).

For highly aromatic charge stocks e.g., having a 260 UVA greater than 80), lower hydrogen pressures can be used, particularly with a catalyst containing Ni and Mo or Ni, Co and Mo, to successfully reduce the 260 UVA. For example, with NiCoMo (Filtrol 500-8) at 500 p.s.i.g. of pure hydrogen, an L.H.S.V. of 0.5 and a gas recycle of 4,000 SCF/BB1, an aromatic oil having a 260 UVA of 114 can be reduced to a UVA of 52 at a contact temperature of 600° F., to about 68 at 625°-625° F.

Examples of the preparation of cable oils (having, for example, viscosities greater than 500 SUS at 100° F. and a 260 UVA less than 8), can be found in the previously referred to applications, Serial No. 622,398 and Serial No. 636,493. For example, after clay treatment, a hydrogenated cable oil can have a viscosity greater than 2000 SUS at 100° F., and IDF less than 0.001 and an ADF less than 0.01.

Examples of the preparation of rubber oils (either of low 260 UVA and aromaticity or of high 260 UVA and aromaticity can be found in the previously referred to application Serial No. 652,026.

Such oils are useful as plasticizers in rubber (especially in EPDM) clay treatment (as with 10-200 lb. attapulgite per BB1 of oil) can improve the color of such hydrotreated oils. The oils produced at treating temperatures above 650° F. (and which contain less than 2 percent of polar compounds) are preferred for use in butyl rubbers, ethylene propylene rubbers and EPDM rubbers, since such rubber oil compositions (especially when they also contain carbon black) have improved tensile strength and modulus.

EXAMPLE II

Two portions of an aromatic extract charge stock obtained by furfural extraction of a naphthenic acid-free naphthenic distillate were contacted at 625° and 650° F., respectively, with an NiW on Al₂O₃ catalyst (available commercially as Harshaw Ni 440 3) at 1800 p.s.i.g. of pure hydrogen at an L.H.S.V. of 0.5 and with a gas recycle of 5,000 SCF/BB1. The properties of the resulting hydrogenated oils, which were useful as refrigerator oils, are shown below:

| Product | Charge Stock | Product Temperature of Contact | |
|---|---|---|---|
| | | 625° F. | 650° F. |
| UVA 0 260 mμ | 3.2 | 0.3 | 0.16 |
| Wt. percent Aromatics | 34.7 | 18.7 | 10.7 |
| Ref. Index | 1.4998 | 1.4854 | 1.4836 |
| Viscosity, 210° F. | 41.2 | 38.0 | 38.2 |
| Viscosity, 100° F. | 158.3 | 96.1 | 102.5 |
| 50% boiling point at 2 mmHg. | 378° F. | 377° F. | 370° F. |

Clay treatment, with attapulgite, can be used to improve the initial color of such hydrogenated refrigerator oils. Contacting with admixtures of acid-activated clay and attapulgite (5-40 lb./BB1. of a mixture 5-75 wt. percent attapulgite) also improves the stability of the oil during use.

We claim:

1. A process for producing lubricating oil stocks of improved stability, comprising contacting a lubricating oil distillate stock with hydrogen, in the presence of a catalyst comprising a hydrogenating component selected from the group consisting of sulfides and oxides of molybdenum and nickel and at least one other iron group metal said contacting being carried out at a temperature of about 650°-680° F., at a space velocity of about 0.1-8.0 liquid volumes of oil per volume of catalyst per hour based on the fresh feed, and at a pressure of about 500-3000 p.s.i. of hydrogen, the combination of conditions being so selected as to effect appreciable hydrogen consumption but no substantial cracking.

2. The process of claim 1 wherein the hydrogenated oil product is clay treated.

3. Process according to claim 1 wherein said contacting is carried out at an inlet hydrogen pressure of from 800-3000 p.s.i. and wherein the hydrogen entering the reactor is from 50 to 100 percent pure.

4. Process of claim 2 wherein said contacting is carried out at an inlet hydrogen pressure of from 800-3000 p.s.i. and wherein the hydrogen entering the reactor is from 50 to 100 percent pure.

5. Process of claim 2 wherein the hydrogenating component is a sulfide combination of nickel, cobalt and molybdenum.

6. Process according to claim 1 wherein said contacting is carried out at an average catalyst temperature of about 680° F.

7. The process of claim 2 wherein said lubricating oil distillate stock is a high naphthene oil having viscosity characteristics in the transformer range.

8. The process of claim 7 wherein said high naphthene oil is a naphthenic distillate.

9. The process of claim 16 wherein the hydrogenating component is a sulfided combination of nickel, cobalt and molybdenum.

10. Process according to claim 1 wherein the hydrogenated product is useful as a refrigerator oil.

11. Process of claim 2 wherein the product of said clay contacting is useful as a refrigerator oil.

12. Process of claim 1 wherein the hydrogenated product is useful as a rubber oil. 40-

13. Process of claim 2 wherein the product of said clay contacting is an electrical oil having a viscosity in the range of 40-10,000 SUS at 100° F.

14. Process according to claim 13 wherein the product oil after the clay contacting has a viscosity greater than 500 SUS at 100° F. and an ultraviolet absorptivity less than 8 at 260 millimicrons.

15. Process according to claim 13 wherein the product of said clay contacting is a cable oil having a viscosity greater than 2000 SUS at 100° F., and which has an IDF less than 0.001 and an ADF less than 0.01.

16. A process according to claim 7 for producing transformer grade oils of better Doble test stability wherein said high naphthene oil is substantially free from alkanes and naphthenic acids and wherein said contacting is carried out at an average catalyst temperature of about 680° F.

17. A process according to claim 16 wherein the transformer oil resulting from said clay contacting has a Doble test life in the range of 2 to 3 days.

* * * * *